C. CALLAHAN.
HOSE-COUPLING.

No. 176,830.

Patented May 2, 1876.

Attest:
C Clarence Poole
R. K. Evans

Inventor
Cornelius Callahan
per attys.
A. H. Evans & Co
Washington
D. C.

UNITED STATES PATENT OFFICE.

CORNELIUS CALLAHAN, OF CHELSEA, MASSACHUSETTS.

IMPROVEMENT IN HOSE-COUPLINGS.

Specification forming part of Letters Patent No. 176,830, dated May 2, 1876; application filed April 11, 1876.

*To all whom it may concern:*

Be it known that I, CORNELIUS CALLAHAN, of Chelsea, Massachusetts, have invented certain new and useful Improvements in Hose-Coupling, of which the following is a full, clear, and exact description, reference being had to the accompanying drawings, making a part of this specification, in which—

Figure 1:
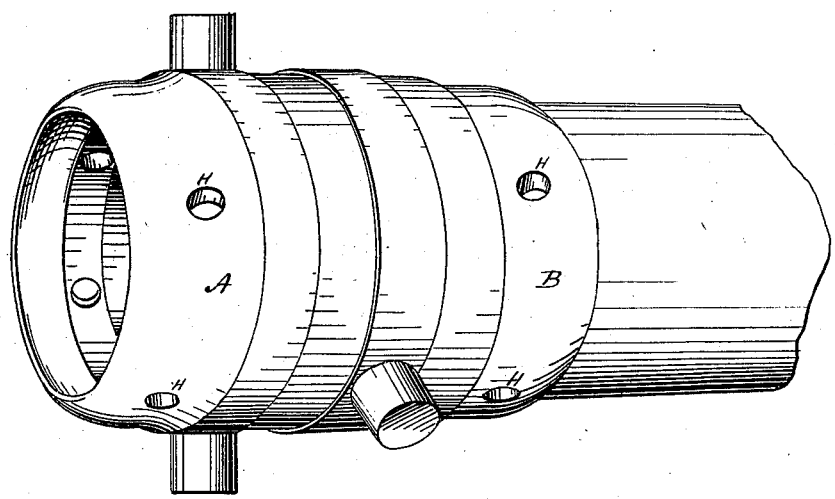
Figure 2:
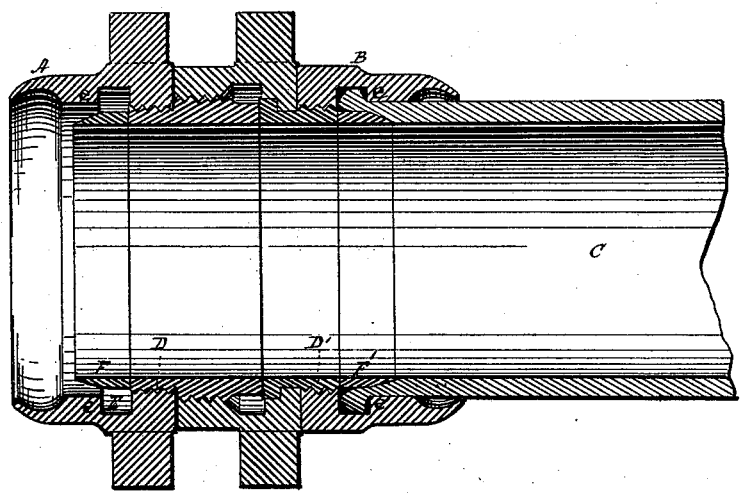

Figure 1 is a perspective view of a coupling with hose attached. Fig. 2 is a longitudinal section of same.

My invention relates more particularly to that class of coupling known as a fire-hose coupling; and it consists in a novel means of securing the hose to the coupling.

To enable others skilled in the art to make and use my invention, I will proceed to describe the exact manner in which I have carried it out.

In the drawings, A B represent outer rings of the coupling, C the hose, and D D' inner annular screws securing the outer rings together. Within the rings A B are provided the grooves E and shoulders $e$ $e'$. Fitting in each of the outer rings A B are the annular wedges F F', against which bear the screws D D'. The hose C is passed into one of the rings, say, for instance, ring B, as shown in the drawing, and the annular wedge F is introduced within the mouth of the hose, as shown at F'. The annular screw D' is then screwed down until it forces the annular wedge F' into the position shown in Fig. 2, when the hose is forced into the groove E and is securely caught and held between the annular wedge and the shoulder $e'$, thus affording a cheap, ready, and effective method of securing the hose to the coupling. H H are drain-holes, to allow the escape of water from within the casings when the hose is hung up to dry.

Heretofore hose after having been used has been hung up in the tower to dry, when the water would settle down into the coupling, and, there being no provision for draining or airing the same, the hose is caused to rot first in the coupling. To overcome this serious trouble I construct the drain-holes H H in the coupling, a new and important feature.

Having thus described my invention, what I claim as new, and desire to secure by Letters Patent, is—

1. In a hose-coupling, the annular wedge F, in combination with an annular ring, B, and screw D', constructed to operate substantially as and for the purpose set forth.

2. An annular ring, provided with the inner groove E and shoulder $e$, in combination with an annular wedge, F, and screw for holding the same in position, substantially as described.

3. The rings A B of a hose-coupling, provided with the drain-holes H H, substantially as and for the purpose set forth.

CORNELIUS CALLAHAN.

Witnesses:
ANNIE A. JENNINGS,
STEPHEN SIBLEY.